United States Patent [19]

Francois et al.

[11] Patent Number: 5,764,417
[45] Date of Patent: Jun. 9, 1998

[54] COMPACT OPTICAL DEVICE FOR NIGHT VISION AND ITS APPLICATION TO GOGGLES

[75] Inventors: Jean-Michel Francois, Talence; Patrick Jolly, Le Pian Medoc; Yves LeFort, Pessac, all of France

[73] Assignee: Sextant Avionique, Meudon La Foret, France

[21] Appl. No.: 675,872

[22] Filed: Jul. 5, 1996

Related U.S. Application Data

[63] Continuation of Ser. No. 258,219, Jun. 10, 1994, abandoned.

[30] Foreign Application Priority Data

Jun. 11, 1993 [FR] France .................. 93 07047

[51] Int. Cl.$^6$ .................. G02B 27/14; G02B 23/00
[52] U.S. Cl. .................. 359/630; 359/353; 359/409
[58] Field of Search .................. 359/353, 355, 359/356, 399–402, 404, 407–409, 419, 629–632, 364–366; 340/980; 345/7–9; 250/214 VT, 330

[56] References Cited

U.S. PATENT DOCUMENTS

| | | | |
|---|---|---|---|
| 4,902,116 | 2/1990 | Ellis | 359/630 |
| 5,084,780 | 1/1992 | Phillips | 359/419 |
| 5,157,548 | 10/1992 | Honnier et al. | 359/630 |

FOREIGN PATENT DOCUMENTS

| | | | |
|---|---|---|---|
| 773829 | 12/1967 | Canada | 359/402 |
| 8700639 | 1/1987 | European Pat. Off. | 359/407 |
| 380035 | 8/1990 | European Pat. Off. | 359/630 |
| 2665267 | 1/1992 | France . | |
| WO8904008 | 5/1989 | WIPO . | |

*Primary Examiner*—Thong Nguyen
*Attorney, Agent, or Firm*—Oblon, Spivak, McClelland, Maier & Neustadt, P.C.

[57] ABSTRACT

A compact optical device used to superimpose an intensified infrared image onto a visible image to allow night vision. It can especially be used to make goggles to be worn under the visor of an aircraft or helicopter pilot's helmet. The device includes a combiner located in front of the pilot's eye for directly transmitting visible light to the pilot and an objective for receiving infrared light which is placed above the combiner. An optical system guides the light received by the objective towards the combiner to be forwarded to the pilot's eye. The light is guided in a single plane substantially perpendicular to the plane containing the light received by the objective. The optical system includes a light intensifier, a transport objective, an even number of mirrors to fold the optical circuit and an eye piece.

7 Claims, 4 Drawing Sheets

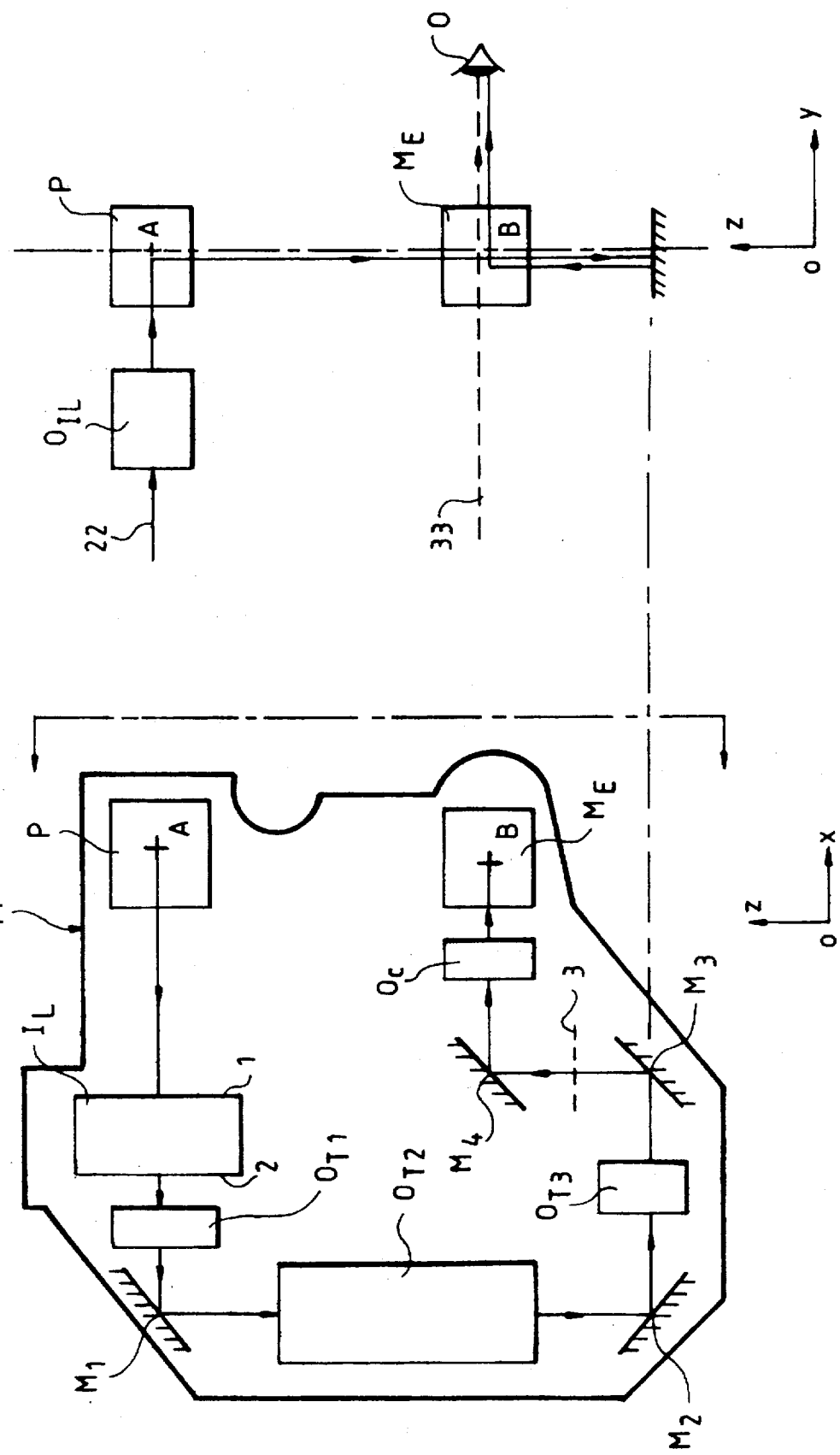

COMPACT OPTICAL DEVICE FOR NIGHT VISION AND ITS APPLICATION TO GOGGLES

This application is a continuation of application Ser. No. 08/258,219, filed on Jun. 10, 1994, now abandoned.

BACKGROUND OF THE INVENTION

1. Field of the Invention

This invention concerns a compact optical device used to superimpose a second image originating from a light intensification device onto the visible image, allowing night vision.

This type of device is particularly applicable for making goggles that can be worn, for example, under the visor of an aircraft or helicopter pilot's helmet or for an infantryman, allowing him to observe scenes during the day or night.

2. Discussion of the Background

This type of goggles has been described, for example, in patent application PCT WO 89/04008. For each of the pilot's eyes, the goggles comprise an optical circuit for light directly visible to the pilot, an intensification circuit used to intensify infrared light originating from a night scene and to convert it into light visible to the pilot's eye, and finally an optical combiner used to combine these circuits and to direct the two images that they produce towards the pilot's eye.

The first problems encountered with this type of equipment are its weight which is an obvious disadvantage for the pilot, and its volume which may make it necessary to use special helmets in which the visor is well-separated from the pilot's face to make room for inserting goggles; both the helmet and goggles can cause problems if the pilot is ejected. Another problem is that the light intensity of the nocturnal image may be insufficient.

SUMMARY OF THE INVENTION

An object of the invention is an optical night vision device with low weight and volume, with an improved optical efficiency.

Consequently, the device according to the invention comprises, for each of the pilot's eyes:

a combiner located in a first direction in front of the pilot's eye and directly transmitting visible light to the pilot;

an objective receiving infrared light from a second direction parallel to the first direction, for example located above the pilot's eye;

optical means for guiding the light received by the objective to the combiner, guidance taking place in a single plane that does not contain the first and second directions, and including:

a light intensifier forming a visible image intensified from an infrared image;
a transport objective;
an even number of mirrors, in one embodiment;
an eyepiece; the combiner reflecting the intensified image in the first direction towards the pilot's eye.

BRIEF DESCRIPTION OF THE DRAWINGS

Other objects, features and results of the invention will become clear in the following description given as an example and illustrated by the appended drawings that represent:

FIGS. 1a, 1b and 1c, are the front, side and top views of one embodiment of the device according to the invention;

FIG. 3, an embodiment of the transport objectives illustrated in FIG. 1a;

The same references refer to the same elements in all these various figures.

DESCRIPTION OF THE PREFERRED EMBODIMENTS

Figure 1C:
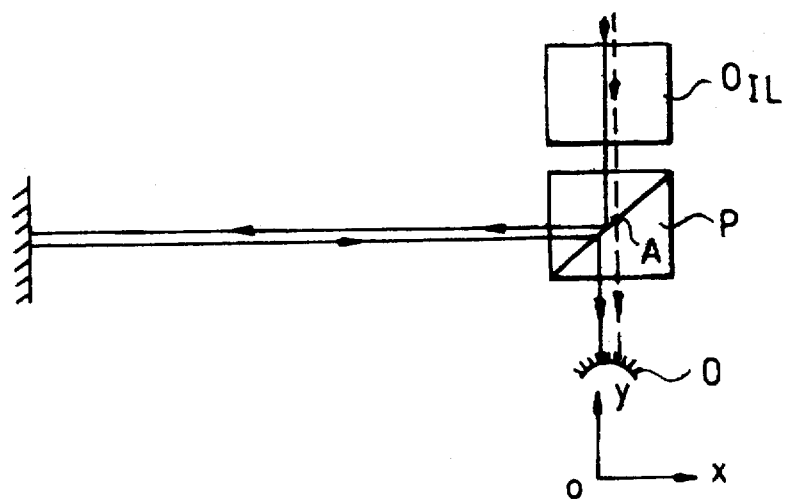

Therefore FIG. 1a is a front view in the XOZ plane of the night vision device according to the invention, whereas FIG. 1b is a side view, in other words in a ZOY plane normal to the XOZ plane, and FIG. 1c shows a top view in an XOY plane, also normal to XOZ and ZOY planes, of the same device.

This device, with global reference 11 on FIG. 1a, is applicable to one of the eyes of the observer (pilot), for example the left eye on the figures, the eye marked O being located in front of point B on FIG. 1a, in front of the plane of the figure.

The infrared light 22 originating from an observed night scene, in other words wavelengths within the spectral range 0.7 to 1 µm, is received by a camera type objective $O_{IL}$. This objective $O_{IL}$ is designed to form an image of the scene at infinity, or at a finite distance or if there is a focusing adjustment, on the input face 1 of a device $I_L$ (face 1 of the device $I_L$ coincident with the image focal plane of the objective $O_{IL}$), transforming the received infrared light into visible light with intensification, such as a light intensifier tube. The objective $O_{IL}$ is preferably placed above the pilot's eye on a line parallel to OZ. The infrared light 22 and then the visible light obtained by intensification of this infrared light, is shown as solid lines: It is received by the device according to the invention along an OY axis, and is returned in the XOZ plane along the OX direction by a device P (point A), for example made using a mirror or preferably a return prism, such that the size of objective $O_{IL}$ can be reduced.

An optical circuit guides the light output from the intensifier $I_L$ in the XOZ plane, to a combiner $M_E$ (point B) located in front of the observer's eye. This combiner $M_E$ firstly reflects the intensified light 22 in the OY direction towards the observer's eye O. It is also transparent to visible light 33 (shown in dashed lines) originating from the scene at infinity along the OY direction. The combiner $M_E$ can conventionally consist of two attached rectangular prisms in which the common face (not shown on the figures) forms a semi-transparent, or dichroic or holographic mirror.

The optical guidance circuit is formed from a transport objective $O_T$, for example consisting of three parts $O_{T1}$, $O_{T2}$, and $O_{T3}$, made necessary by the fact that the optical trajectory to bring the intensified image to the eye is long, an eyepiece $O_C$ to transfer the received image to infinity, located in front of combiner $M_E$, and four mirrors $M_1$, $M_2$, $M_3$ and $M_4$, each of which is positioned so that it reflects light at 90° from its incident direction.

Therefore it is apparent that the observer's eye O firstly directly receives visible light 33 parallel to the OY direction, and secondly receives infrared light 22, also parallel to the OY direction, after intensification and conversion in an optical circuit located in the XOZ plane.

In this embodiment, the circuit for guiding the intensified and converted infrared light is placed in a plane parallel to the XOZ plane, normal to the OY direction of the incident radiation.

Figure 2:
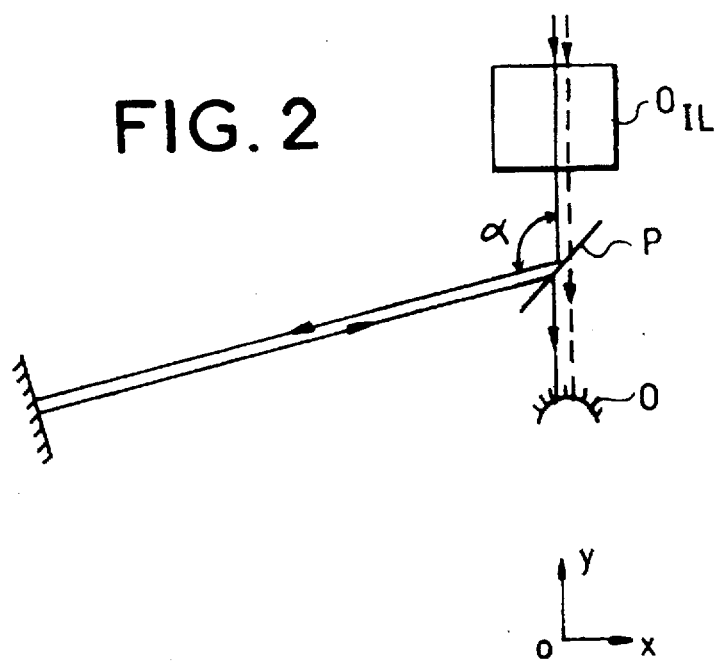
FIG. 2, a variant embodiment of the device in FIG. 1c.

FIG. 2 represents an alternative embodiment of the device according to the invention, in which this guidance circuit still lies within a plane, but that plane is no longer perpendicular to the incident OY direction: it makes an angle $\alpha$ with the OY direction exceeding 90°, for example of the order of 110°.

The purpose of this embodiment is to reduce the size of the device when it is designed to make goggles placed under the visor of a pilot's helmet, since they can then be more similar to the shape of the pilot's face.

Figure 3:
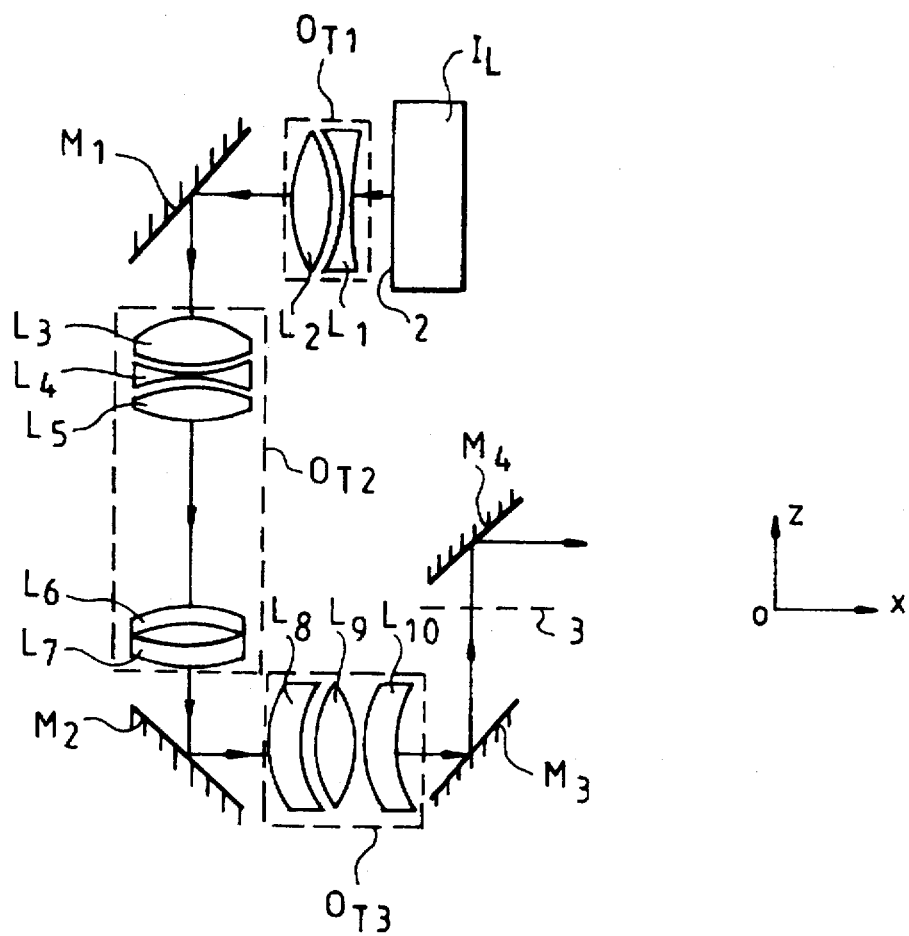

FIG. 3 shows an embodiment of the part of the device according to the invention which contains the transport objective.

This figure shows the light intensifier $I_L$ and the various lenses making up the various parts $O_{T1}$, $O_{T2}$, $O_{T3}$ of the transport objective. These lenses are defined and positioned such that the image formed on the output face 2 of the light intensifier IL, face 2 which is therefore coincident with the object focal plane of the transport objective, will be transported to a second plane 3, the image focal plane of the objective, which is itself coincident with the object focal plane of the eye piece $O_C$.

In this embodiment, a first part $O_{T1}$ of the transport objective is formed from two lenses $L_1$ and $L_2$. Light originating from lens $L_2$ along axis OX is reflected by mirror $M_1$ along the OZ axis and intersects a first group of three lenses $L_3$, $L_4$, $L_5$ in a second part $O_{T2}$ of the objective, and then second group of two lenses $L_6$ and $L_7$ in this same part. The mirror $M_2$ returns light output from lens $L_7$ in the OX direction, where it encounters a group of three lenses $L_8$, $L_9$ and $L_{10}$ forming the final part $O_{T3}$ of the transport objective. The mirror $M_3$ returns light output from lens $L_{10}$ in the OZ direction to mirror $M_4$ that returns it along the OY direction to the eyepiece and combiner $M_E$. In this embodiment, the focal plane 3 is located between mirrors $M_3$ and $M_4$.

FIGS. 4a, 4b, 4c and 4d represent an embodiment of night vision goggles using two devices similar to those described above, showing perspective, front, side and top views respectively.

These various figures show two combiners $M_E$, one placed in front of each of the pilot's two eyes, the combiners receiving visible light originating from the scene along the OY direction, and two objectives $O_{IL}$ designed to capture the infrared radiation originating from the scene along the same OY direction. Each of these devices according to the invention is inserted in a box 11, except for objective $O_{IL}$, with the image intensifiers IL projecting outside. The goggles also include a central mechanical structure 42 containing means 41 for attaching the assembly to the pilot's helmet.

Finally, they conventionally include means for adjustment of the distance between the eyes, such as knurled knob 40. According to one embodiment, the adjustment is made using two separate knurled knobs as shown on FIG. 4, each acting on one of the assemblies 11. This alternative can translate each of the assemblies 11 in its own plane making an angle $\alpha$ with the direction OY, and consequently to further reduce the size of the goggles.

Figure 4A:
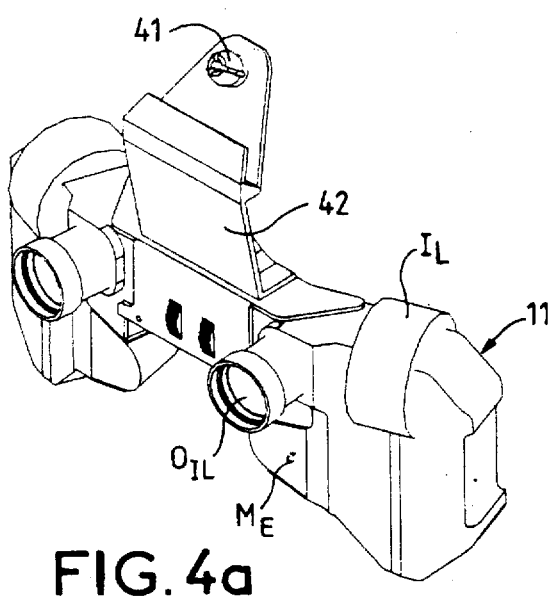
FIGS. 4a, 4b, 4c and 4d show perspective, front, side and top views, respectively of an embodiment of night vision goggles according to the invention.
Figure 4C:
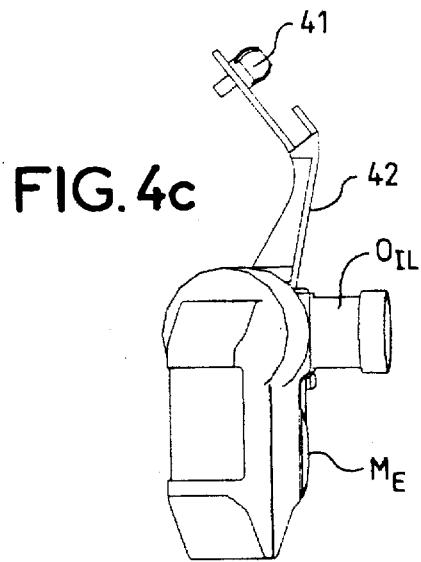
Figure 4B:
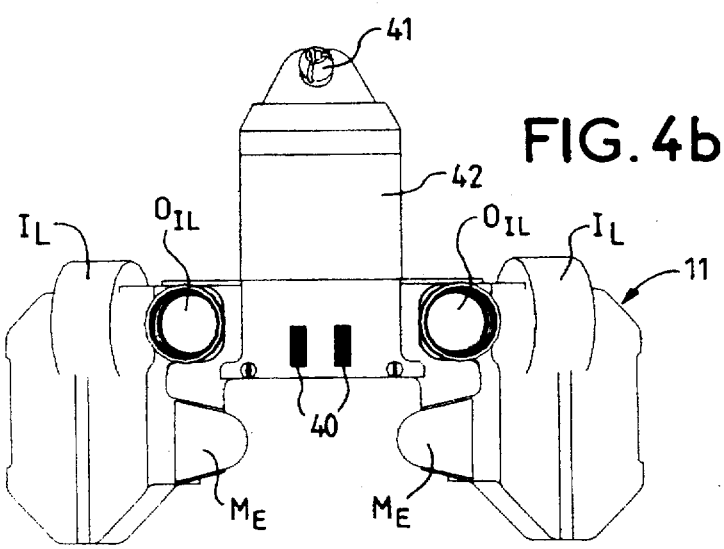
Figure 4D:
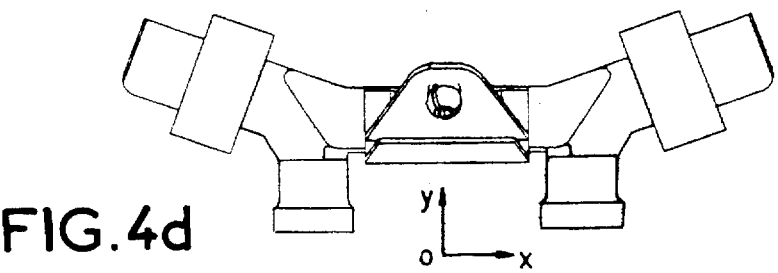

The top view shown in FIG. 4d shows that this embodiment uses the variant shown in FIG. 2.

We have thus described a very compact optical device for night vision, which does not need for an additional image rotation device.

In known systems, firstly objective type optical devices invert the images that they form (180° rotation); secondly, multiple reflections of optical circuits in a limited space can also induce image rotations. It is known to compensate for these various rotations by using one (or several) image rotation devices, each being formed of a bundle of twisted optical fibers.

The optical circuit according to the invention is designed to avoid the use of this type of fiber bundle, this result being achieved by keeping the optical circuit between the prism P and the combiner $M_E$ in a single plane that does not contain the direction OY of arrival of rays 22 and 33 (this plane being not necessarily perpendicular to the axis OY), and placing a number, n, of return mirrors in this plane, where n depends on the number of objectives used in the device; in the embodiment described here, two objectives ($O_{IL}$ and $O_T$) are used such that an even number of mirrors is needed. Obviously, when necessary, an additional transport objective can be added, and the number of mirrors will then be odd. Note that the relative positions of mirrors, the transport objective and the light intensifier are interchangeable, the only criterion being the search for compactness. The same is true for the return direction of each mirror, which is not necessarily normal to the incident direction, but which must nevertheless remain in the same plane.

Finally, this preferred folding for the optical circuit between elements P and $M_E$ makes it possible to move the objective $O_{IL}$ closer to the eye and thus avoid the large parallax effect between direct perception (light 33) and perception from the light intensifier $I_L$ (light 22).

Also, avoiding the use of an optical fiber bundle can prevent a substantial loss of the optical efficiency: as known, the transmission factor of this type of fiber system is low (about 50%). However the transmission factor is very important for operational needs in which maximum gain is required. Avoiding the use of a fiber bundle is also important in the total system weight.

We claim:

1. An optical device positioned in front of an observer's eye for night vision, comprising:

a combiner, located in a first direction in front of the observer's eye for directly transmitting visible light to the observer;

an objective receiving infrared light from a second direction parallel to the first direction, said first and second directions defining a first plane;

optical means for guiding the infrared light received by the objective to said combiner, said optical means lying in a single second plane, said second plane making with said first plane an angle different from 90°, the optical means including a means for forming an intensified visible image from the received infrared light; a transport objective; n mirrors, where n is dependent on the number of objectives in the device; and an eyepiece;

said first direction intersecting said second plane at a first point and said second direction intersecting said second plane at a second point, the line joining said first and second points being perpendicular to said first direction; and the combiner reflecting the intensified visible image along the first direction towards the observer's eye.

2. Device according to claim 1, wherein said angle is of the order of 110°.

3. Device according to claim 1, wherein n is even.

4. Device according to claim 1, wherein is four.

5. Device according to claim 1, further comprising means for forwarding the infrared light from the objective to said means for forming an intensified visible image.

6. Night vision goggles, comprising two devices according to claim 1, one device for each of the observer's eyes, and means for adjusting the distance between the eyes.

7. Goggles according to claim 6, wherein the means for adjusting the distance between the eyes translates each of the devices along a line contained in the plane of the guidance means.

* * * * *